US006769779B1

(12) United States Patent
Ehrne et al.

(10) Patent No.: US 6,769,779 B1
(45) Date of Patent: Aug. 3, 2004

(54) HOUSING FOR MOUNTING MODULATION AND POLARIZATION COMPONENTS IN ALIGNMENT WITH AN OPTICAL PATH

(75) Inventors: Franklin D. Ehrne, Rochester, NY (US); Barry D. Silverstein, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/624,346

(22) Filed: Jul. 22, 2003

(51) Int. Cl.⁷ .............................................. G03B 21/14
(52) U.S. Cl. ...................................... 353/120; 359/500
(58) Field of Search ................... 353/20, 119; 359/486, 359/500; 349/9, 58, 96

(56) References Cited

U.S. PATENT DOCUMENTS

| | | | |
|---|---|---|---|
| 6,053,616 A | 4/2000 | Fujimori et al. | |
| 6,056,407 A | 5/2000 | Iinuma et al. | |
| 6,122,103 A | 9/2000 | Perkins et al. | |
| 6,234,634 B1 | 5/2001 | Hansen et al. | |
| 6,345,895 B1 | 2/2002 | Maki et al. | |
| 6,375,330 B1 | 4/2002 | Mihalakis | |
| 6,406,151 B1 | 6/2002 | Fujimori | |
| 6,447,120 B1 | 9/2002 | Hansen et al. | |
| 6,460,998 B1 * | 10/2002 | Watanabe | 353/20 |
| 6,585,378 B2 | 7/2003 | Kurtz et al. | |
| 2003/0117708 A1 | 6/2003 | Kane | |
| 2003/0218722 A1 * | 11/2003 | Tsao et al. | 353/20 |

OTHER PUBLICATIONS

G.H. Ho, C.H. Chen, Y.C. Fang, H.S. Lin, C.R. Ou, and T.Y. Chen; "The Mechanical–Optical Properties of Wire–Grid Type Polarizer in Projection Display System" SID 02 Digest, pp. 648–651.

* cited by examiner

Primary Examiner—William C. Dowling
(74) Attorney, Agent, or Firm—Nelson Adrian Blish (57) ABSTRACT

A housing (100) for mounting a wire grid polarizing beamsplitter (122) and a spatial light modulator (30) in alignment with an output optical path comprises a front plate having an opening for admitting incident illumination provided along an illumination axis. A modulator mounting plate (110) is spaced apart from and parallel to the front plate, for mounting the spatial light modulator in the optical output path of the illumination axis. First and second polarizer support plates are spaced apart from each other and extend between the front plate and the modulator mounting plate. The respective facing inner surfaces of the first and second support plates provide coplanar support features for supporting the wire grid polarizing beamsplitter between the inner surfaces. The wire grid polarizing beamsplitter extends between the facing inner surfaces. The surface of the wire grid polarizing beamsplitter is a fixed angle with respect to the surface of the spatial light modulator on the modulator mounting plate. The fixed angle defining an output optical axis along the output optical path.

26 Claims, 7 Drawing Sheets

HOUSING FOR MOUNTING MODULATION AND POLARIZATION COMPONENTS IN ALIGNMENT WITH AN OPTICAL PATH

CROSS REFERENCE TO RELATED APPLICATIONS

Reference is made to commonly-assigned copending U.S. patent application Ser. No. 09/813,207, filed Mar. 20, 2001, entitled A DIGITAL CINEMA PROJECTOR, by Kurtz et al.; U.S. patent application Ser. No. 10/040,663, filed Jan. 7, 2002, entitled DISPLAY APPARATUS USING A WIRE GRID POLARIZING BEAMSPLITTER WITH COMPENSATOR, by Mi et al.; and U.S. patent application Ser. No. 10/050,309, filed Jan. 16, 2002, entitled PROJECTION APPARATUS USING SPATIAL LIGHT MODULATOR, by Joshua M. Cobb, the disclosures of which are incorporated herein.

FIELD OF THE INVENTION

This invention generally relates to digital imaging apparatus and more particularly relates to a frame for and method for mounting polarization components and a reflective LCD spatial light modulator.

BACKGROUND OF THE INVENTION

Initially introduced as small-scale imaging devices for business presentation markets, digital color projectors have steadily improved in overall imaging capability and light output capacity. In order for digital motion picture projectors to compete with conventional motion picture film projectors such as those used in theaters, however, a number of significant technical hurdles remain. Unlike conventional motion picture projectors, high-quality digital projection systems provide separate color modulation paths for red, green, and blue (RGB) color image data. The design of digital color projection apparatus requires that monochromatic light beams carrying images formed on each of the individual color channels be combined, with proper intensity and registration, in order to project a full color image.

Figure 1:
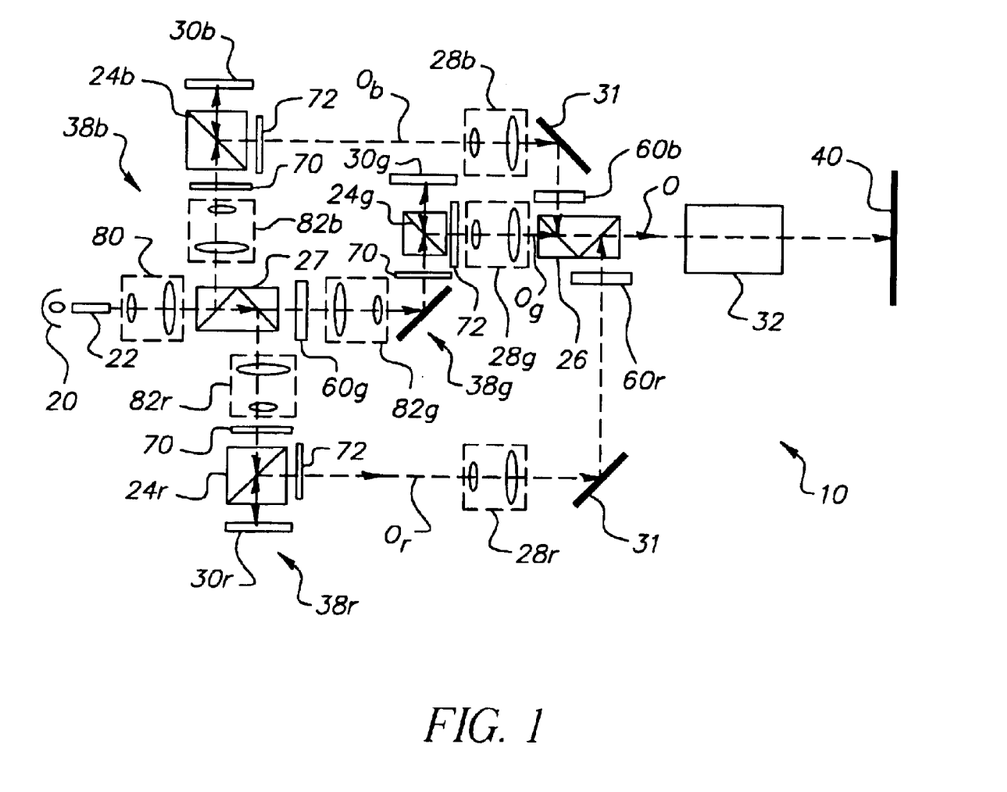
FIG. 1 is a schematic block diagram showing the overall arrangement of components for a projection apparatus using a reflective LCD spatial light modulator.

Referring to FIG. 1, there is shown a simplified schematic for a digital motion picture projection apparatus 10 as described in U.S. patent application Ser. No. 10/050,309, incorporated herein by reference. Each color channel (r=Red, g=Green, b=Blue) uses similar components for forming a modulated light beam. Individual components within each path are labeled with an appended r, g, or b, appropriately. For the description that follows, however, distinctions between color channels are specified only when necessary. A light source 20 provides unmodulated light, which is conditioned by uniformizing optics 22 to provide a uniform illumination, directed through an illumination relay lens 80 to a dichroic separator 27. Dichroic separator 27 splits the white light into red, green, and blue color channels. Following any of the three color channels, light goes to a light modulation assembly 38 in which a relay lens 82 directs light through a prepolarizer 70 to a polarizing beamsplitter 24. Light having the desired polarization state is transmitted through polarizing beamsplitter 24 and is then modulated by a spatial light modulator 30, which selectively modulates the polarization state of the incident light over an array of pixel sites. The action of spatial light modulator 30 forms an image. The modulated light from this image, reflected from polarizing beamsplitter 24, is transmitted along an optical axis $O_r/O_g/O_b$ through an analyzer 72 and is directed by a magnifying relay lens 28, through an optional folding mirror 31, to a dichroic combiner 26, typically an X-cube, Philips prism, or combination of dichroic surfaces in conventional systems. An optional color-selective polarization filter 60 may also be provided in the modulated light path. Dichroic combiner 26 combines the red, green, and blue modulated images from separate optical axes $O_r/O_g/O_b$ to form a combined, multicolor image for a projection lens 32 along a common optical axis O for projection onto a display surface 40, such as a projection screen.

The reflective liquid crystal device (LCD) of FIG. 1 is a type of spatial light modulator that is widely used in digital projector design. This device accepts polarized light and modulates the polarization of the incident light to provide colored light beam as output. For obtaining polarized light, a polarizing beamsplitter prism, such as a McNeille prism, is typically employed along with the support of one or more polarizing elements, configured as polarizers and analyzers.

Because modulated light must be combined from each of three color channels in order to synthesize a color image, correct registration of the modulated light is important. When the modulated light is reflected from the surface of spatial light modulator 30, angular errors in the relative alignment of each LCD surface can cause significant shifts in resolution, yielding unsatisfactory image quality. Further image quality problems, such as loss of contrast, can be the result of imperfect alignment of polarization support components, particularly for polarizing beamsplitter 24. Moreover, thermal expansion effects can cause further drift in registration and degrade polarization components performance. Thermal expansion becomes a particular concern with high-end projection apparatus, since high brightness is required in these applications. At the same time, compact optical packaging is desirable, with minimized optical path length between image-forming components and the projection lens. These conflicting requirements complicate the design of high-brightness projection apparatus.

The negative impact of thermal expansion on image registration is well known in the art. In response to this problem, U.S. Pat. No. 6,345,895 (Maki et al.) discourages use of a mounting base for supporting reflective spatial light modulators, polarizing beamsplitters, and related polarization support components. Significantly, the U.S. Pat. No. 6,345,895 disclosure even teaches away from the use of a mounting base formed from metals or composite materials having low coefficients of expansion. Instead, the approach proposed U.S. Pat. No. 6,345,895 mounts spatial light modulator components directly to glass prism components used for beamsplitting or color combining, so that components in the optical path remain in alignment with thermal expansion. This same overall type of approach is also taught in U.S. Pat. No. 6,375,330 (Mihalakis); U.S. Pat. No. 6,053,616 (Fujimori et al.); and U.S. Pat. No. 6,056,407 (Iinuma et al.).

One recognized problem with attachment to prism components is in achieving the initial alignment itself. As one example, U.S. Pat. No. 6,406,151 (Fujimori) describes methods for adhesively affixing LCD components to a prism with alignment. While attachment directly to a glass or plastic prism surface may have advantages for minimizing thermal expansion effects, there appear to be a number of drawbacks with solutions that use adhesives, compounding thermal dissipation concerns for the LCD itself and making component replacement a costly and time-consuming procedure.

Recently, as is disclosed in U.S. Pat. No. 6,122,103 (Perkins et al.), high quality wire grid polarizers have been developed for use in the visible spectrum. While existing wire grid polarizers may not exhibit all of the necessary performance characteristics needed for obtaining the high contrast required for digital cinema projection, these devices have a number of advantages. Chief among these advantages are the following:

(i) Good thermal performance. Wire grid polarizers do not exhibit the thermal stress birefringence that is characteristic of glass-based polarization devices, as was noted above.

(ii) Robustness. Wire grid polarizers have been shown to be able to withstand anticipated light intensity, temperature, vibration, and other ambient conditions needed for digital cinema projection.

(iii) Good angular response. These devices effectively provide a higher numerical aperture than is available using conventional glass polarization beamsplitters, which allows relatively higher levels of light throughput when compared against conventional devices.

(iv) Good color response. These devices perform well under conditions of different color channels. It must be noted, however, that response within the blue light channel may require additional compensation.

U.S. Patent Nos. 6,234,634 and 6,447,120 (both to Hansen et al.) and U.S. Pat. No. 6,585,378 (Kurtz et al.) disclose image projection apparatus using wire grid polarizing beamsplitters. The wire grid polarizing beamsplitter offers advantages over conventional prism-based polarizing beamsplitters, particularly due to its small size and weight. It can be appreciated that there could be advantages for light modulation in a combination using wire grid polarizer and analyzer components. However, as with the more conventional beamsplitter and polarizers employed in prior art projection apparatus, wire grid components are themselves subject to thermal expansion effects and must be properly aligned with respect to the spatial light modulator within each color channel, with thermal effects taken into account.

An article in the SID 02 Digest entitled "The Mechanical-Optical Properties of Wire-Grid Type Polarizer in Projection Display System" by G. H. Ho et al., presents some of the key design considerations for deploying wire grid polarizer components in imaging apparatus using reflective LCD spatial light modulators. Noting problems caused by mechanical constraint and thermal stress in a comparatively low-power projection apparatus, the Ho et al. article highlights the overall negative impact of conventional mounting techniques for wire grid polarizing beamsplitters. Notably, the Ho et al. disclosure is directed to an imaging system that uses a reflective LCD spatial light modulator that transmits modulated light thru a wire grid polarizing beamsplitter. Inherent problems in that type of system include astigmatism, which can be corrected using techniques described in the Ho et al. article. Among other problems noted in the Ho et al. article are surface deformation caused by thermal effects on the wire grid polarizing beamsplitter. It can be appreciated that problems for low-to intermediate-power projection apparatus, as highlighted in the Ho et al. article, would be even more pronounced for higher energy projection equipment.

Among key design considerations for mounting a wire grid polarizing beamsplitter is maintaining the surface of this component at an accurate. 45 degree orientation relative to both the surface of the spatial light modulator and the surface of an analyzer. A related problem that must be resolved in electronic projection apparatus design is alignment of the spatial light modulator itself relative both to the wire grid polarizing beamsplitter and to the projection optical path. Maintaining precision alignment without the negative effects of thermal drift is a key design goal for high-end electronic projection apparatus.

Unlike the imaging application of the Ho et al. configuration, projection apparatus 10 of FIG. 1 (of which the present invention is part) uses reflective LCD spatial light modulator's 30r, 30g, 30b that direct modulated light back to the corresponding polarizing beamsplitter's 24r, 24g, 24b, which in turn reflect light towards the imaging lens. In order to substitute wire grid polarizing beamsplitter's for conventional prism based polarizing beamsplitter components, the thermal effects highlighted by Ho et al. must be considered. However, because the position of the polarizing beamsplitter is as a reflective surface in the path of modulated light, the inherent thermal impact on imaging problems is even more pronounced than for the system described in the Ho et al. article. That is, with wire grid polarizing beamsplitter components used in place of polarizing beamsplitter's 24r, 24g, 24b, convergence, contrast, and general wave front aberrations are serious concerns for the optical designer. These optical effects are due to surface deformation, lateral shifts, or tilt and/or rotations, and all of which can be induced by thermal stress. Ho et al. not only does not consider the problems encountered with high intensity illumination, but these specific problems incurred in a reflective structure, and the solutions thereof, are also not considered by Ho et al.

As another recent reference, U.S. Patent Application Publication 2003/0117708 (Kane) discloses a sealed enclosure comprising of a wire grid polarizing beamsplitter, a spatial light modulator and a projection lens having the interior space filled with a inert gas or vacuum. Among the goals stated in U.S. 2003/0117708 are protection of the wire grid component from corrosion and handling and modular packaging of the optics assembly. While this approach may be useful in some small-scale projection environments employing only a single spatial light modulator, the apparatus and method of U.S. 2003/0117708 would not be suitable for the high-heat environment of a full-color projection apparatus designed for commercial use, such as for use in motion picture theaters. Moreover, high-quality digital projection requires the use of a separate spatial light modulator for each color channel, with high-quality projection optics. In order to provide suitable contrast, additional support components for the polarizing beamsplitter are needed to provide further polarization selectivity. The relative alignment of these supporting polarization components with the polarizing beamsplitter and with the overall imaging path is significant. No provision is made for deploying or adding these supporting components in U.S. 2003/0117708. In addition, the U.S. 2003/0117708 methods do not anticipate nor provide solutions due to thermal distortion and stress birefringence that would be induced in a high-heat environment, as a result of over constraint and heat containment within the sealed enclosure.

Thus it can be seen that, while wire grid polarizers and polarizing beamsplitters offer some advantages for digital projection apparatus, problems of alignment and complexities presented by thermal expansion effects must be resolved in order to obtain suitable performance from these components.

SUMMARY OF THE INVENTION

It is an object of the present invention to provide an apparatus and technique for mounting spatial light modulator and supporting polarization components that is mechanically robust, that allows thermal expansion without degrading image quality, and that allows straightforward alignment of components in the light modulation path. With this object in mind, the present invention provides a housing for mounting a wire grid polarizing beamsplitter and a spatial light modulator in alignment with an output optical path, comprising:

(a) a front plate having an opening for admitting incident illumination provided along an illumination axis;

(b) a modulator mounting plate, spaced apart from and parallel to the front plate, for mounting the spatial light modulator in the path of the illumination axis;

(c) first and second polarizer support plates, spaced apart from each other and extending between the front plate and the modulator mounting plate; the respective facing inner surfaces of the first and second support plates providing coplanar support features for supporting the wire grid polarizing beamsplitter between the inner surfaces; and the wire grid polarizing beamsplitter being extended between and normal to the facing inner surfaces, the surface of the wire grid polarizing beamsplitter at a fixed angle with respect to the surface of the spatial light modulator on the modulator mounting plate, the fixed angle defining an output optical axis along the output optical path.

It is a feature of the present invention that it provides a modular housing for a spatial light modulator and supporting polarization components for a single color channel.

It is an advantage of the present invention that it provides a mounting method for accurately aligning a wire grid polarizing beamsplitter relative to the optical path for modulated light. Using the apparatus and method of the present invention, no adjustment to polarizing beamsplitter position is necessary once the housing is mounted in place. Only slight adjustment for spatial light modulator positioning is necessary in any color channel.

It is a further advantage of the apparatus and method of the present invention it allows conventional optical fabrication tolerances to be used in manufacture of a precision alignment housing.

It is a further advantage of the present invention that it allows replacement of the spatial light modulator for a single color channel without necessitating re-adjustment of supporting polarization components. The complete set of modulation and polarization components for a single color channel are packaged as a unit, allowing ease of removal for serviceability.

It is yet a further advantage of the present invention that it provides a mounting arrangement for polarization components that is robust and allows for thermal expansion effects.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 2:
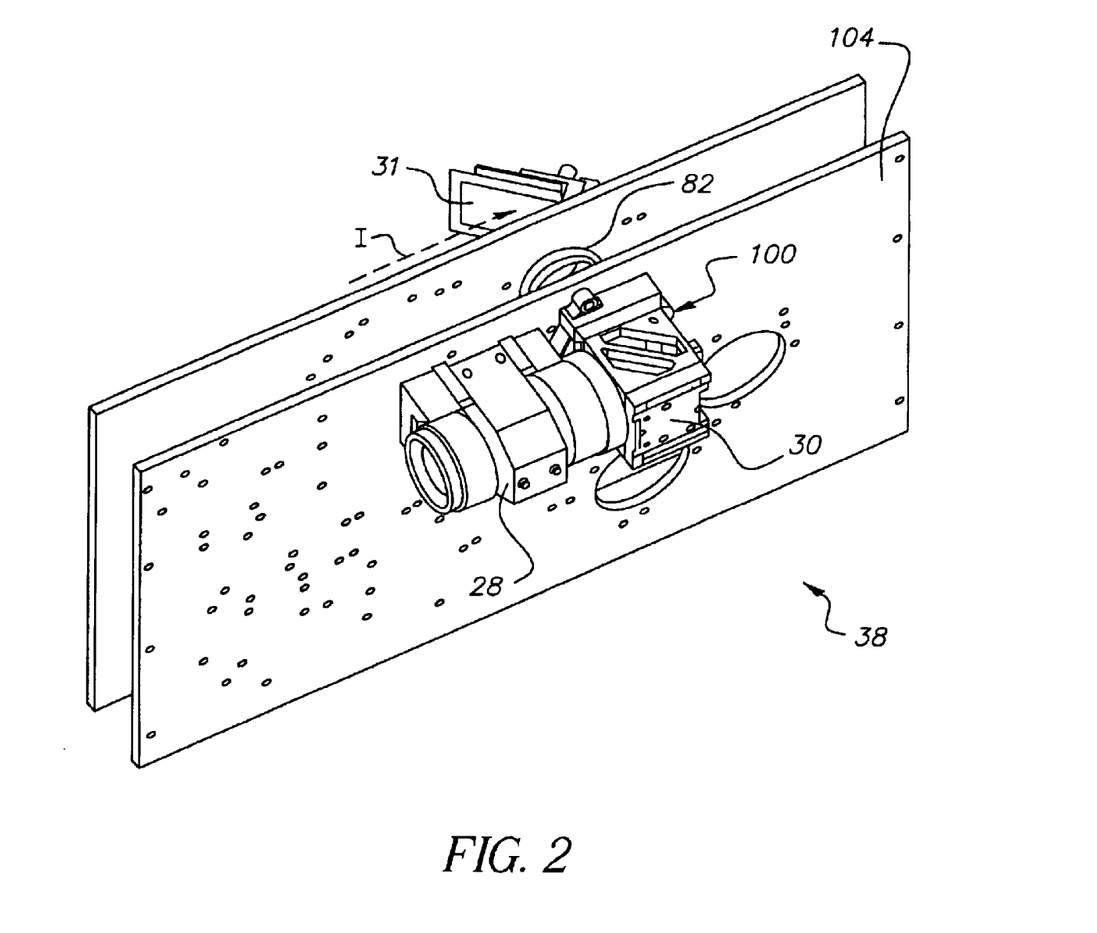
FIG. 2 is a perspective view showing components of the housing of the present invention, in relation to other components in the optical path.
Figure 3:
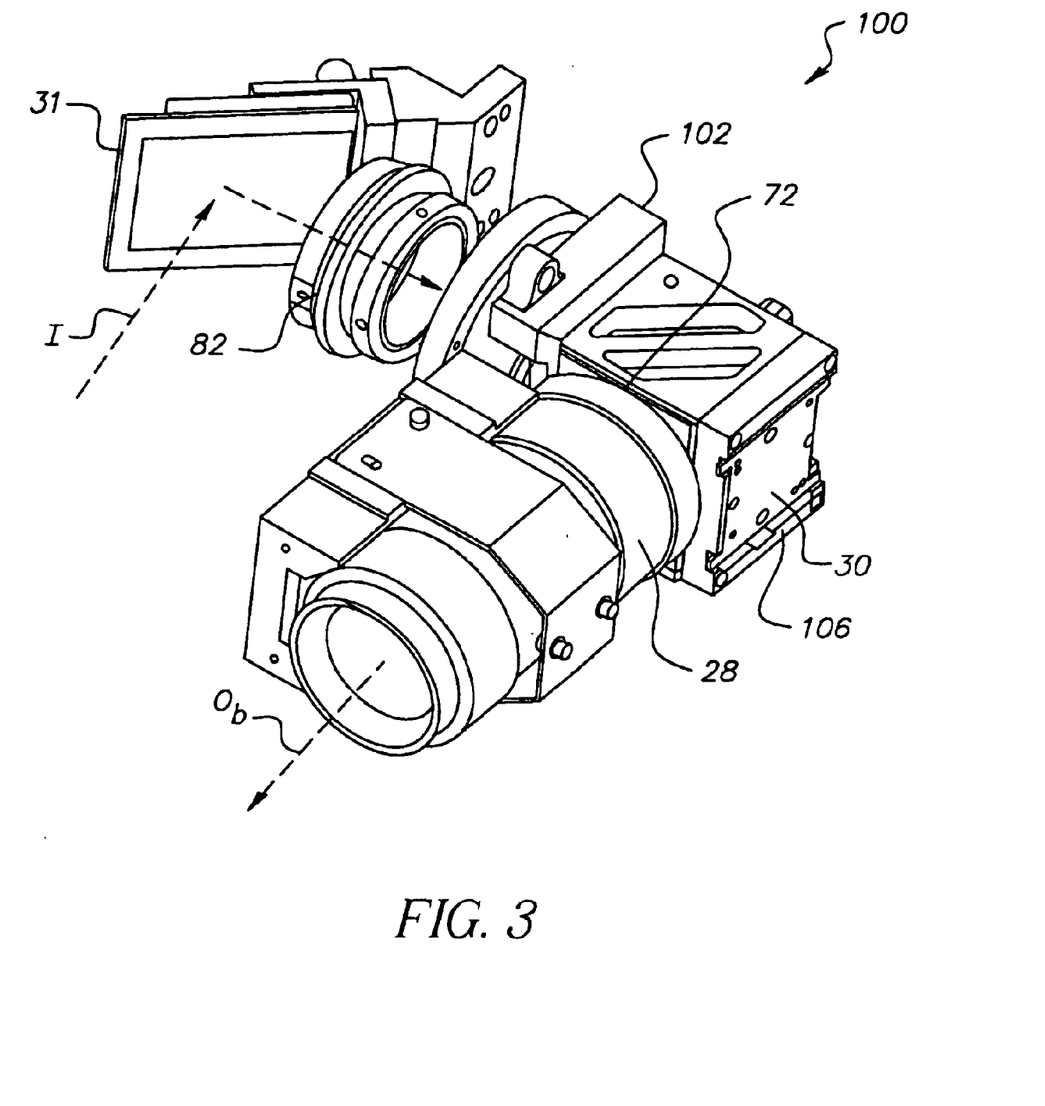
FIG. 3 is a perspective view showing the components of the housing of the present invention enlarged, without mounting details shown in FIG. 2.

Referring to FIGS. 2 and 3, there are shown perspective views of a housing 100 for mounting spatial light modulator 30 and its supporting polarization components for a single color modulation channel, the blue channel in a preferred embodiment, to a chassis wall 104 within projection apparatus 10. Monochrome illumination I is directed to turning mirror 31 which reflects illumination I through magnifying relay lens 82 and through a ring bore 102 into housing 100. Output modulated light along axis $O_b$ is then directed through reducing relay lens 28 to combining and projection optics, as was described with reference to FIG. 1. A modulator mount 106 is attached as part of housing 100.

Figure 4:
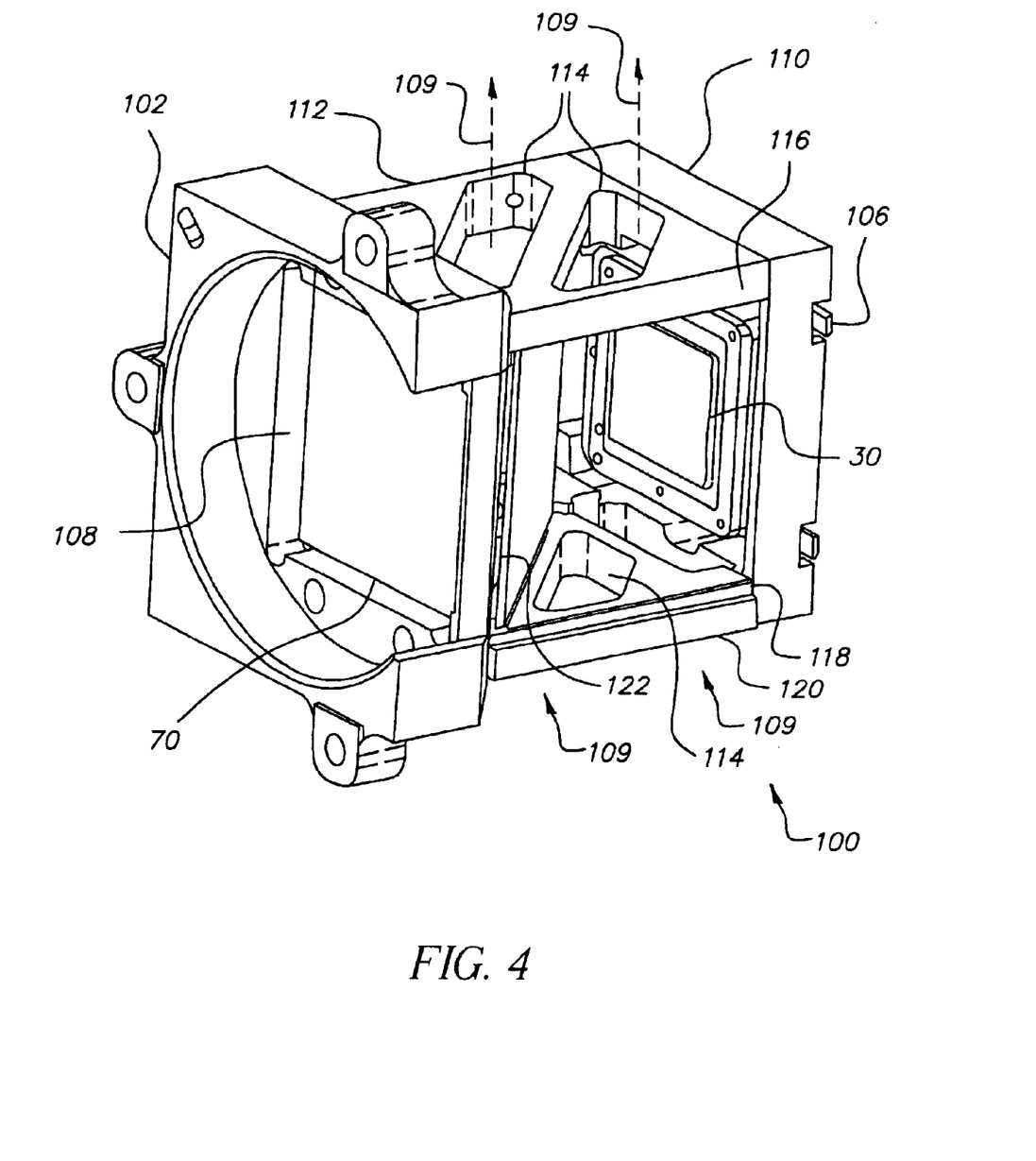
FIG. 4 is a perspective view showing internal components of the housing of the present invention, with the analyzer removed.

Referring to FIG. 4, there is shown a perspective front view with analyzer 72 removed to show internal components and overall structure of housing 100. Modulator mount 106 attaches to a modulator mounting plate 110. Fitted into modulator mounting plate 110 are a top plate 112 and a base plate 120, separating modulator mounting plate 110 and ring bore 102. Within housing 100, a wire grid polarizing beamsplitter 122 is disposed at a fixed diagonal angle relative to the surface of spatial light modulator 30. A registration recess 118 is provided along the edge of base plate 120, providing a seat for the bottom edge of analyzer 72. Prepolarizer 70 is mounted within a recess 108 provided by ring bore 102 and is lightly fixed in position using a flexible, compliant adhesive, such as an RTV type adhesive.

Figure 7:
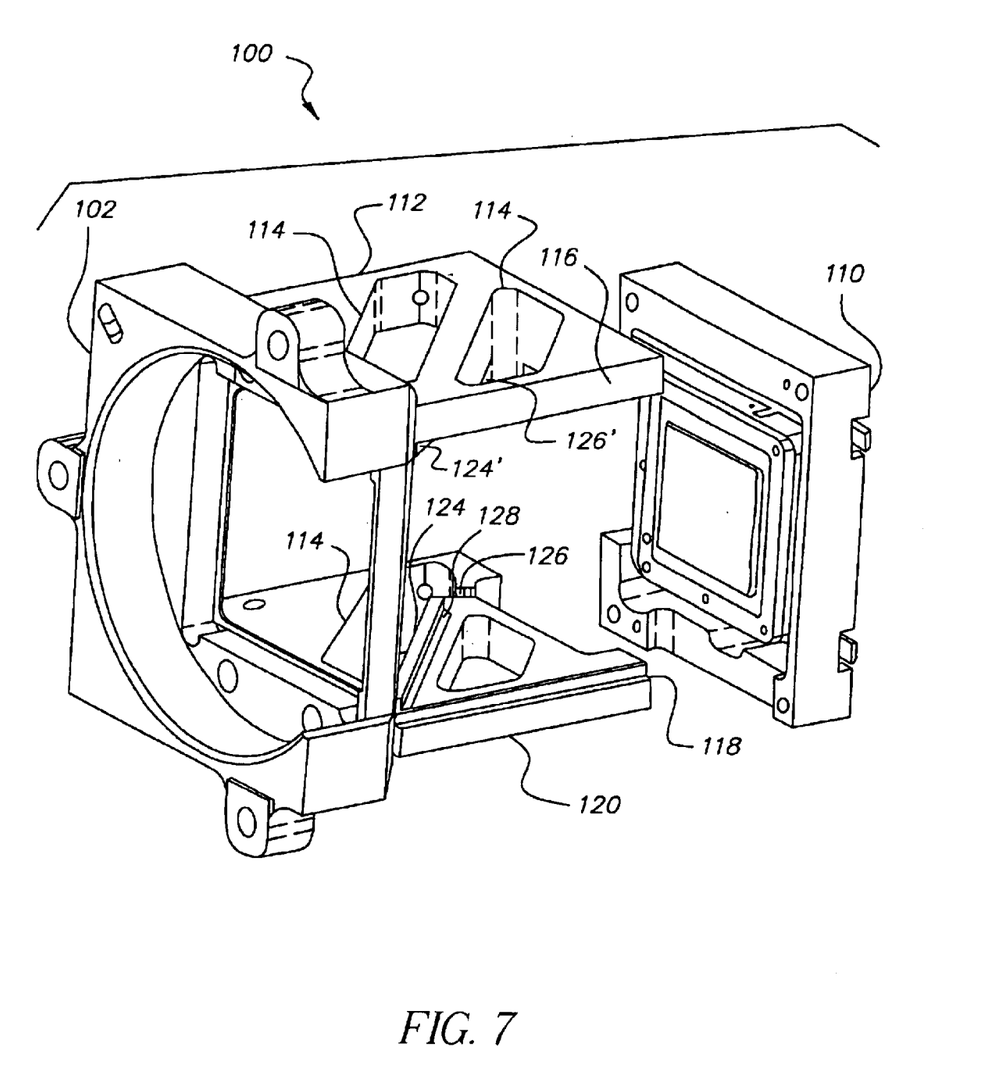
FIG. 7 is a perspective, exploded view showing the key support structure separated from the mounting plate used for attachment of the spatial light modulator.

Referring to FIG. 7, there is shown a perspective view of housing 100 with modulator mounting plate 110 removed. The portion of housing 100 consisting of top plate 112, base plate 120, and ring bore 102 can be fabricated as a single unit, such as by casting. In whatever manner housing 100 is fabricated, corresponding support features on facing surfaces of base plate 120 and top plate 112 must be mutually aligned in order to register wire grid polarizing beamsplitter 122 and analyzer 72 between these surfaces with minimal constraint. Wire grid polarizing beamsplitter 122 is fitted against coplanar registration surfaces 124 and 124' on base plate 120 and top plate 112, respectively. The bottom edge of wire grid polarizing beamsplitter 122 seats atop a beamsplitter seating base 128. In one embodiment, coplanar registration surfaces 124 and 124' are aligned to be coplanar by machining, following assembly of top plate 112 and base plate 120 to ring bore 102. Edge guides 126 and 126' are likewise machined in the same operation to be colinear with the edge of polarizing beamsplitter 122 when in housing 100.

Similarly, for supporting analyzer 72, a registration recess 118 on base plate 120 is aligned so that its rear surface is coplanar with a side surface 116 of top plate 112. Slots 114 are provided in top and base plates 112 and 120, maximizing air flow 109, ambient or dedicated forced air, across one or both surfaces of the polarizing beamsplitter, also providing additional cooling to adjacent polarization and modulation components. Furthermore, cooling the polarization beamsplitter can have the added benefit of preventing a differential thermal expansion of the polarizing beamsplitter and/or its mount, that could cause the polarizing beamsplitter to rotate from its normal position and thus induce a convergence (screen position) error.

Base plate 120 and top plate 112 can be fitted into modulator mounting plate 110 and ring bore 102 using conventional mating methods for machined or cast metal components. Pins and detents may be used for alignment of these components to form the outer shell of housing 100 as shown in FIG. 4. The components are then screwed together to provide housing 100 as a single, modular component. For uniform thermal expansion, similar materials are used for fabrication of base plate 120, top plate 112, modulator mounting plate 110, and ring bore 102. In a preferred embodiment, base plate 120, top plate 112, modulator mounting plate 110, and ring bore 102 are made of aluminum. Alternately, some other material having a low coefficient of thermal expansion could be used, such as Invar or some types of stainless steel for example.

Precision alignment with the illumination system (axis I as shown in FIGS. 2 and 3) is not critical; there is some tolerance allowable for alignment in the path of unmodulated light. Advantageously, housing 100 provides self-centering to illumination axis I, within allowable tolerance, so that further manual alignment is unnecessary. Referring back to FIG. 3, the barrel of relay lens 82 provides this self-centering by fitting into ring bore 102, which is itself fastened to chassis wall 104.

Alignment of Polarizing Components

Figure 5:
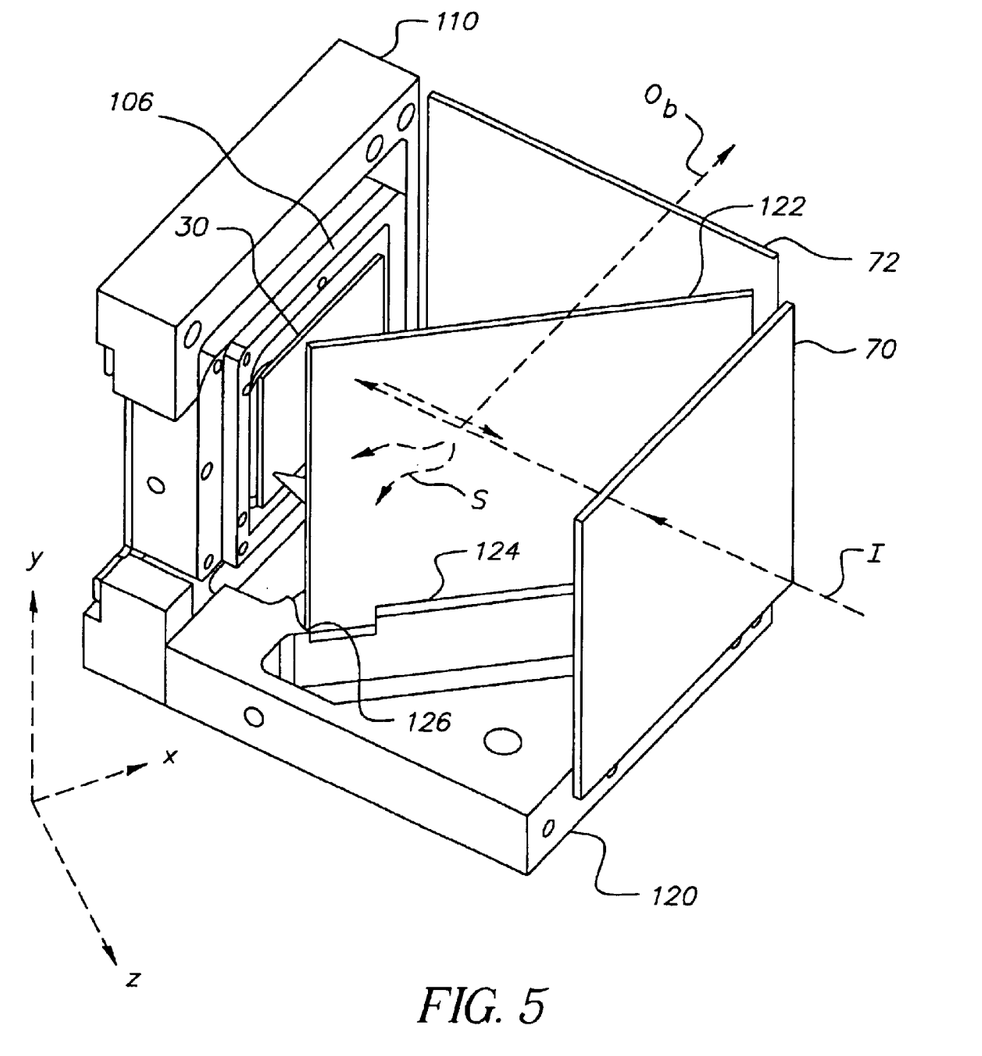
FIG. 5 is a perspective view showing internal components of the housing of the present invention for modulation and polarization, with the top cover plate removed.

Referring to FIG. 5, there is shown a perspective view of polarization and modulation components, with top plate 112 and ring bore 102 removed and with analyzer 72 shown in place. FIG. 5 shows details of the configuration of modulator mounting plate 110 and of base plate 120. As was noted with respect to FIG. 7, base plate 120 has coplanar registration surface 124, or an equivalent type of mechanical feature that acts as a datum for seating wire grid polarizing beamsplitter 122 at the needed fixed angle with respect to spatial light modulator 30. In a preferred embodiment, this fixed angle is at 45 degrees. Beamsplitter seating base 128, shown most clearly in FIG. 7, then provides a vertical datum for alignment of wire grid polarizing beamsplitter 122 in the y direction as indicated in FIG. 5. Coplanar registration surface 124 provides a datum for alignment of wire grid. polarizing beamsplitter 122 in the z-direction. An edge guide 126. in base plate 120 serves as a datum point for horizontal alignment of wire grid polarizing beamsplitter 122 along coplanar registration surface 124, that is, in the x direction as indicated in FIG. 5. As is shown in FIG. 7, a corresponding edge guide 126' in top plate 112 is aligned with edge guide 126 in base plate 120 to provide a pair of datum points for horizontal (x-direction) alignment of one edge of polarizing beamsplitter 122 that extends between base plate 120 and top plate 112.

In the design of housing 100, thermal expansion of polarizing components is permitted in controlled directions, opposite datum points or surfaces. The use of edge guide 126 and coplanar registration surface 124 allows thermal expansion of wire grid polarizing beamsplitter 122 outward from the corner point of contact near edge guide 126. A surface of wire grid polarizing beamsplitter 122 near its bottom edge is seated against coplanar registration surface 124 on base plate 120; the top edge of wire grid polarizing beamsplitter 122 lies against the surface of coplanar registration surface 124' on top plate 112, with allowance provided for thermal expansion along this top edge. A small amount of flexible, compliant adhesive, such as an RTV type adhesive, can be used to stabilize the bottom edge of wire grid polarizing beamsplitter 122 against seating base 128 and to stabilize the top edge of wire grid polarizing beamsplitter 122 to the surface of coplanar registration surface 124' on top plate 112. Similarly, analyzer 72, seated against registration recess 118 as is shown in FIG. 7, can expand at its top edge, which is flexibly adhered to side surface 116. By allowing some tolerance for thermal expansion and allowing expansion only in predictable directions (x and y as shown in FIG. 5), the design of housing 100 thereby minimizes bending or other distortion of wire grid polarizing beamsplitter 122 and of analyzer 72 due to heat effects.

It can be observed that the fabrication of housing 100 as shown in FIGS. 4, 5, and 7 allows an initial, approximate positioning of polarization and modulation components relative to projection optics for a color channel, that is, providing initial alignment of the three polarization components (prepolarizer 70, wire grid polarizing beamsplitter 122, and analyzer 72), and of spatial light modulator 30. There remains, of course, some small tolerance related to alignment of the edges of wire grid polarizing components with the precise polarization axis of these components, accurate to within about 0.5 degrees using current fabrication techniques.

Conventional optical tolerances and machining practices can be employed in fabrication of housing 100. Advantageously, housing 100 enables the three polarization components to be assembled with needed precision, not requiring further adjustment once these components are set in place. Housing 100 can then be mounted against chassis wall 104. Precision alignment to the output optical path (for example, to $O_b$ in FIGS. 3 or 5) is then obtained by adjusting the relative position of spatial light modulator 30 on modulator mounting plate 110. This final precision alignment is a minor adjustment, typically on the order of a few microns, and can be made once projection apparatus 10 assembly is complete.

For providing image registration with the needed accuracy, the following alignments are of particular importance:
  (i) alignment of wire grid polarizing beamsplitter 122 to the output optical axis, $O_b$ as shown in FIG. 5;
  (ii) alignment of wire grid polarizing beamsplitter 122 with respect to spatial light modulator 30; and
  (iii) alignment of analyzer 72 to wire grid polarizing beamsplitter 122 and to the output optical axis, $O_b$.

Thus, with the apparatus and method of the present invention, alignments (i) and (iii) above are accomplished by assembling components within housing 100 and mounting housing 100 to chassis wall 104, as was shown in FIG. 2. Alignment (ii) above requires that spatial light modulator 30 be positioned against modulator mounting plate 10 and adjusted in place. With this arrangement, then, only one in situ adjustment, that of spatial light modulator 30, is needed for optical alignment of light modulation assembly 38 components within each color channel.

Figure 6:
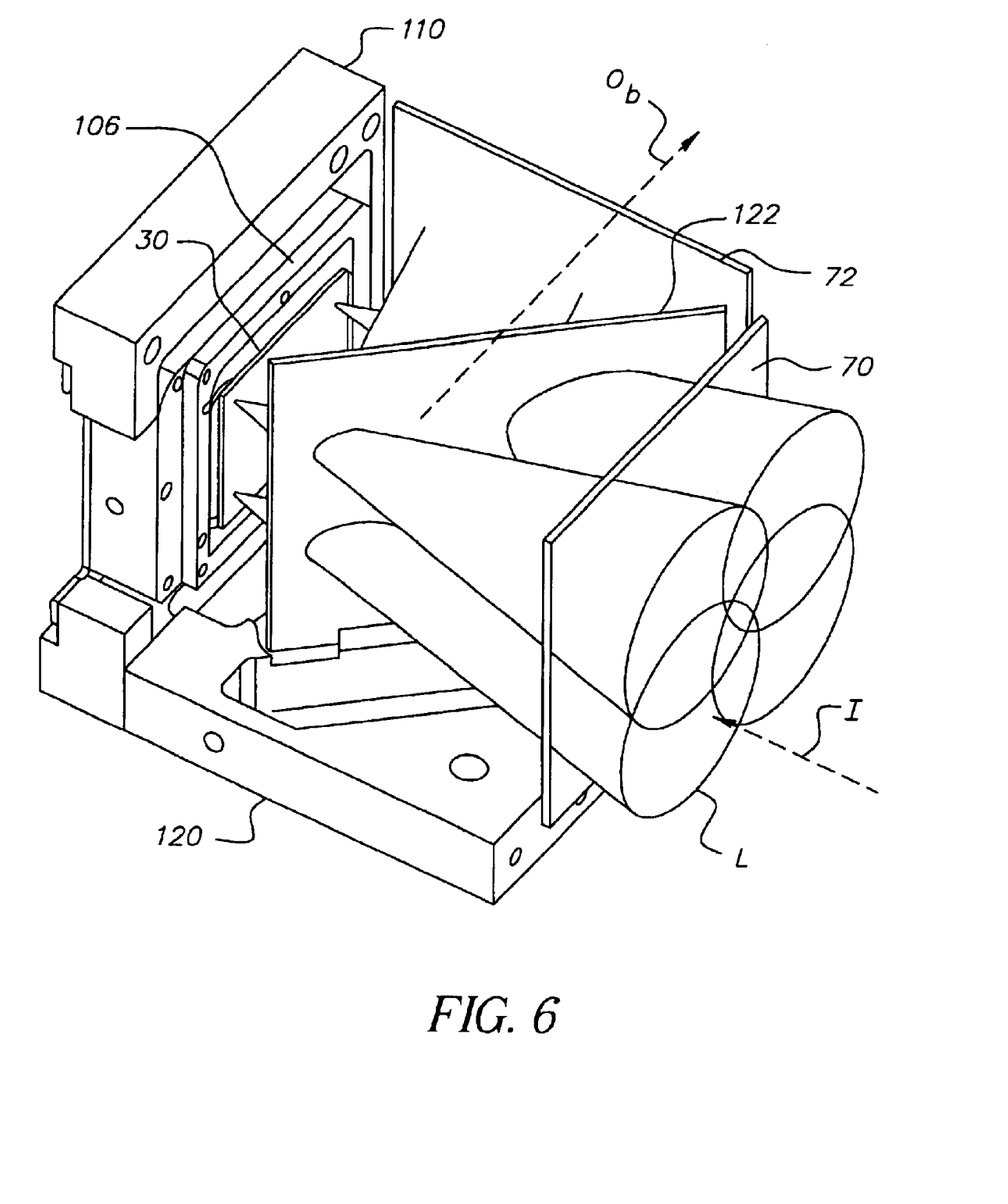
FIG. 6 is a perspective view showing internal components of the housing of the present invention, with the top cover plate removed and with representative light cones shown for illumination and modulated light.

FIG. 6 shows a perspective view showing representative light cones transmitted through and reflected from wire grid polarizing beamsplitter 122.

The alignment of prepolarizer 70 to illumination path I, provided by its mounting within ring bore 102, is sufficiently within tolerance when housing 100 is fully assembled.

Alignment of Spatial Light Modulator 30

Referring back to FIG. 1, the problem of alignment for spatial light modulator 30 can be more readily appreciated. Each color channel $O_r/O_g/O_b$ must be aligned with respect to dichroic combiner 26 in order for precise alignment to output optical axis O. Using housing 100, the position of each spatial light modulator 30 when initially mounted onto modulator mounting plate 110 will already be within some reasonable alignment tolerance, typically within a few pixels, for example. Slight adjustment of each spatial light modulator 30 position, using a projected image target, such as would be familiar to those skilled in the optical alignment arts, then allows final alignment within projection apparatus 10. When this alignment is achieved, each spatial light modulator 30 can be potted in place, using adhesives and techniques well known in the opto-mechanical arts.

A secondary design consideration with the implementation of housing 100 relates to minimizing light leakage that could reduce image contrast. Referring to FIG. 5, some stray light S from the illumination path I can be reflected from the surface of wire grid polarizing beamsplitter 122 rather than being fully transmitted to spatial light modulator 30. Any type of reflective surface in the path of this unwanted, reflected stray light S could reflect some portion of this light through wire grid polarizing beamsplitter 122 in the direction of output axis $O_b$, thereby reducing contrast. Thus, the use of non-reflective materials within the path of possible stray, reflected light S is recommended. In one embodiment, light-absorbing materials are provided in the path of stray light S.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the designations "top" and "bottom" refer to the layout of housing 100 and its components in one embodiment; the angular orientation of housing 100 could be varied within the scope of the present invention. Coplanar datum surfaces for alignment could be provided by an arrangement of suitably placed mounting points provided on top and base plates 112 and 120, such as using pins or other locating features. Analyzer 72 and prepolarizer 70 components could themselves be wire grid polarizing components or could be other types of conventional planar polarization devices. Analyzer 72 could be a polymer-based polarizer for example.

Unlike conventional mounting approaches in electronic image projection systems that mount polarizer components to glass prism components in order to compensate for thermal expansion, housing 100 of the present invention provides a separate structure that maintains these components in the needed positional relationship with respect to each other. Where U.S. Pat. No. 6,345,895 discourages supporting modulation and polarization components on a metal base, the present invention provides housing 100 employing base plate 120 as a primary supporting structure for these components. Unlike prior art solutions that require numerous settings and adjustments for obtaining the needed alignment of polarization components with each other and with the spatial light modulator, housing 100 of the present invention maintains the position of these components so that only minor adjustment of spatial light modulator 30 is needed to align modulation and polarization components of a color channel with color combining optics. At the same time, the design of housing 100 provides this precise alignment using fabrication and machining techniques that employ merely standard optical tolerances. Unlike apparatus that attach components to a combining prism, housing 100 of the present invention allows each color channel to be independently assembled, adjusted, and serviced, minimizing the impact of adjustments in a single color channel on projection apparatus 10 as a whole. Unlike prior art solutions that comprise multiple sheet metal components, housing 100 of the present invention provides a single, sturdy frame for mounting polarization and modulation components, suitable for a high-energy projection system.

Thus, what is provided is an apparatus and method for mounting polatization components and a reflective LCD spatial light modulator in a configuration that is thermally robust and allows straightforward alignment techniques.

PARTS LIST

10 Projection apparatus
20 Light source
22 Uniformizing optics
24 Polarizing beamsplitter
24r Polarizing beamsplitter, red
24g Polarizing beamsplitter, green
24b Polarizing beamsplitter, blue
26 Dichroic combiner
27 Dichroic separator
28 Magnifying relay lens
28r Magnifying relay lens, red
28g Magnifying relay lens, green
28b Magnifying relay lens, blue
30 Spatial light modulator
30r Spatial light modulator, red
30g Spatial light modulator, green
30b Spatial light modulator, blue
31 Folding mirror
32 Projection lens
38 Light modulation assembly
38r Light modulation assembly, red
38g Light modulation assembly, green
38b Light modulation assembly, blue
40 Display surface
60 Color-sensitive polarization filter
60r Color-selective polarization filter, red
60g Color-selective polarization filter, green
60b Color-selective polarization filter, blue
70 Prepolarizer
72 Analyzer
80 Illumination relay lens
82 Relay lens
100 Housing
102 Ring bore
104 Chassis wall
106 Modulator mount
108 Recess 109 Air flow
110 Modulator mounting plate
112 Top plate
114 Slots
116 Side surface
118 Registration recess
120 Base plate
122 Wire grid polarizing beamsplitter
124 Coplanar registration surfaces
124' Coplanar registration surfaces
126 Edge guides
126' Edge guides
128 Beamsplitter seating base

What is claimed is:

1. A housing for mounting a wire grid polarizing beamsplitter and a spatial light modulator in alignment with an output optical path, comprising:
   (a) a front plate having an opening for admitting incident illumination provided along an illumination axis;
   (b) a modulator mounting plate, spaced apart from and parallel to said front plate, for mounting said spatial light modulator in said optical output path of said illumination axis;
   (c) first and second polarizer support plates, spaced apart from each other and extending between said front plate and said modulator mounting plate;
   said respective facing inner surfaces of said first and second support plates providing coplanar support features for supporting said wire grid polarizing beamsplitter between said inner surfaces; and
   said wire grid polarizing beamsplitter being extended between and normal to said facing inner surfaces, said surface of the wire grid polarizing beamsplitter at a fixed angle with respect to said surface of said spatial light modulator on said modulator mounting plate, said fixed angle defining an output optical axis along said output optical path.

2. A housing according to claim 1 wherein said first and second polarizer support plates further provide a pair of coplanar first and second edge support elements for registering an edge of the wire grid polarizing beamsplitter.

3. A housing according to claim 1 wherein said first polarizer support plate further comprises a first analyzer seating feature for supporting a surface of an analyzer and aligning an edge of said analyzer;
   said first analyzer seating feature coplanar with a corresponding second analyzer seating feature on said second polarizer support plate; and
   said first and second polarizer support plates thereby providing support for an analyzer extended between said first and second polarizer support plates in the output optical path.

4. A housing according to claim 1 wherein said support plates providing adequate venting for ambient or forced air flow across the polarization and modulation components.

5. A housing according to claim 1 wherein said spatial light modulator is a reflective liquid crystal spatial light modulator.

6. A housing according to claim 1 wherein said front plate further comprises a recess for housing a prepolarizer.

7. A housing according to claim 1 wherein said opening in said front plate is a ring bore.

8. A housing according to claim 1 wherein said fixed angle of the surface of the wire grid polarizing beamsplitter with respect to the surface of the spatial light modulator on said modulator mounting plate is a diagonal.

9. A housing according to claim 1 wherein said coplanar support features are selected from the group consisting of machined surfaces and locating pins.

10. A housing according to claim 3 wherein said analyzer comprises a wire grid polarizing component.

11. A housing according to claim 3 wherein said analyzer comprises a polymer-based polarizer.

12. A housing for mounting a wire grid polarizing beamsplitter and a spatial light modulator in alignment with an output optical path, comprising:
   (a) a front plate having an opening for admitting incident illumination provided along an illumination axis through a prepolarizer component;
   (b) a modulator mounting plate, spaced apart from and parallel to said front plate, for mounting the spatial light modulator in the path of said illumination axis;
   (c) first and second polarizer support plates, spaced apart from each other and extending between said front plate and said modulator mounting plate;
   said respective facing inner surfaces of said first and second support plates providing coplanar support features for supporting the wire grid polarizing beamsplitter extended between said inner surfaces;
   wherein said first and second polarizer support plates further provide a pair of coplanar first and second edge support elements for registering an edge of the wire grid polarizing beamsplitter;
   said first and second polarize support plates further comprising coplanar support features for mounting an analyzer in the output optical path; and
   said wire grid polarizing beamsplitter being extended between and normal to said facing inner surfaces, the surface of the wire grid polarizing beamsplitter at a fixed angle with respect to the surface of the spatial light modulator on said modulator mounting plate, said fixed angle defining an output optical axis along the output optical path.

13. A housing according to claim 12 wherein said spatial light modulator is a reflective liquid crystal spatial light modulator.

14. A housing according to claim 12 wherein said opening in said front plate is a ring bore.

15. A housing according to claim 12 wherein said fixed angle of the surface of the wire grid polarizing beamsplitter with respect to the surface of the spatial light modulator on said modulator mounting plate is a diagonal.

16. A housing according to claim 12 wherein said coplanar support features are selected from the group consisting of machined surfaces and locating pins.

17. A housing according to claim 12 wherein said analyzer comprises a wire grid polarizing component.

18. A housing according to claim 12 wherein said prepolarizer component comprises a wire grid polarizing component.

19. A housing according to claim 12 wherein said prepolarizer component comprises a polymer-based polarizer.

20. A housing for mounting a wire grid polarizing beamsplitter and a spatial light modulator in alignment with an output optical path, comprising:
   (a) a front plate having an opening for admitting incident illumination provided along an illumination axis;
   (b) modulator mounting means for mounting the spatial light modulator in the path of said illumination axis;
   (c) first and second polarizer support plates, spaced apart from each other and extending from said front plate;

said respective facing inner surfaces of said first and second support plates providing coplanar support features for supporting the wire grid polarizing beamsplitter between said inner surfaces; and said wire grid polarizing beamsplitter being extended between and normal to said facing inner surfaces, the surface of the wire grid polarizing beamsplitter at a fixed angle with respect to the surface of the spatial light modulator, said fixed angle defining, by reflection of light from the spatial light modulator, an output optical axis along the output optical path.

21. A method for mounting a wire grid polarizing beamsplitter and a spatial light modulator in alignment with an output optical path, comprising:
   (a) directing incident illumination along an illumination axis;
   (b) mounting the spatial light modulator in the path of said illumination axis;
   (c) extending the wire grid polarizing beamsplitter between spaced apart first and second polarizer support plates, wherein
      (i) the respective facing inner surfaces of said first and second support plates provide coplanar support features for supporting a wire grid polarizing beamsplitter extended between said facing inner surfaces;
      (ii) the inner surface of said first polarizer support plate defines a first edge datum for registering a first edge of said wire grid polarizing beamsplitter and defines a first point of a second edge datum for registering a second edge of said wire grid polarizing beamsplitter, wherein said second edge is adjacent and perpendicular to said first edge, said second edge extending between said first and second polarizer support plates;
      (iii) the inner surface of said second polarizer support plate defines a second point of said second edge datum; and said wire grid polarizing beamsplitter thereby supported at a normal to said inner surfaces, the surface of said wire grid polarizing beamsplitter at a fixed angle with respect to the surface of the spatial light modulator, said fixed angle defining an output optical axis along the output optical path.

22. A method for mounting according to claim 21 wherein the step of extending the wire grid polarizing beamsplitter between said first and second polarizer support plates further comprises the step of applying a flexible adhesive at a point of contact of the wire grid polarizing beamsplitter against the inner surface of said second polarizer support plate.

23. A method for mounting according to claim 21 further comprising the step of extending an analyzer between coplanar support features on said first and second support plates.

24. A method for mounting according to claim 21 further comprising the step of adjusting the position of the spatial light modulator for alignment of said output optical axis.

25. A method for mounting according to claim 21 wherein the step of mounting the spatial light modulator comprises the step of attaching the spatial light modulator to a mounting plate, said mounting plate being attached to said first and second polarizer support plates.

26. A method for mounting according to claim 21 wherein said fixed angle is a diagonal.

\* \* \* \* \*